United States Patent [19]

Braden

[11] Patent Number: 5,552,498
[45] Date of Patent: Sep. 3, 1996

[54] PREPARATION OF AMPHOTERIC ACRYLIC ACID COPOLYMERS SUITABLE AS OIL-IN-WATER EMULSION BREAKERS

[75] Inventor: Michael L. Braden, Sugar Land, Tex.

[73] Assignee: Nalco Chemical Company, Naperville, Ill.

[21] Appl. No.: 567,761

[22] Filed: Dec. 5, 1995

Related U.S. Application Data

[62] Division of Ser. No. 311,626, Sep. 23, 1994, abandoned.

[51] Int. Cl.$^6$ ............................... C08F 4/04; C08F 2/10; C08F 220/06
[52] U.S. Cl. .......................... 526/73; 526/81; 526/86; 526/219.1; 526/219.5; 526/307; 526/307.6; 526/312; 210/705; 210/708; 210/735
[58] Field of Search ..................... 526/73, 86, 219.1, 526/219.5, 307, 312, 81, 307.6; 210/735

[56] References Cited

U.S. PATENT DOCUMENTS

| | | | |
|---|---|---|---|
| 4,251,651 | 2/1981 | Kawakami et al. | 526/219.5 X |
| 5,176,797 | 1/1993 | Hartan et al. | 526/307 X |

FOREIGN PATENT DOCUMENTS

| | | | |
|---|---|---|---|
| 3312424 | 10/1984 | Germany | 526/219.5 |

*Primary Examiner*—Fred Teskin
*Attorney, Agent, or Firm*—James J. Drake; Robert A. Miller

[57] ABSTRACT

The invention comprise a composition for breaking oil-in-water emulsions comprising adding from about 1 part per million to about 500 parts per million of an amphoteric acrylic acid copolymer to the emulsion. Once the copolymer is added, the emulsion is subjected to agitation until the oil-in-water emulsion is resolved and the oil and water separates into two phases. The oil and water phases are then subjected to a separation technique to separate the phases. The invention further comprises a method of synthesizing the amphoteric polymers used in the emulsion breaking application.

2 Claims, No Drawings

PREPARATION OF AMPHOTERIC ACRYLIC ACID COPOLYMERS SUITABLE AS OIL-IN-WATER EMULSION BREAKERS

This application is a division of application Ser. No. 08/311,626, filed Sep. 23, 1994, now abandoned.

BACKGROUND OF THE INVENTION

1. Field of the Invention

The invention relates to the field of oil-in-water emulsion breaking and, more particularly, to a method of breaking emulsions in an industrial waste water environment by the addition of an amphoteric copolymer.

2. Description of the Prior Art

Environmental regulations continue to focus upon reducing the level of contaminants in water effluent from industrial plants. In several industries, such as the steel and aluminum industries, refineries, automotive plants and laundries, contaminants such as oil-in-water (O/W) emulsions are a major problem. There is a need for a faster, more efficient means of disposing of the harmful products contained in waste waters. Usually, the addition of inorganic materials such as polyaluminum chloride gives good performance. However, the use of inorganic chemicals continues to be problematic in light of stricter environmental guidelines regulating the use of inorganics. Desirably, an organic product that would have comparable or improved performance when compared to the inorganics would be used.

An object of the claimed invention is the resolution of oil-in-water emulsions by the addition of an amphoteric copolymer. Currently available amphoteric copolymers include, DADMAC/Acrylic Acid, available from Nalco Chemical Company as Nalco® N-8190. The DADMAC/Acrylic Acid copolymer does a poor job of resolving O/W emulsions or dispersions. As a result, a copolymer having emulsion breaking properties equal to or better than the inorganics currently being used is needed.

SUMMARY OF THE INVENTION

The invention comprises a composition for breaking oil-in-water emulsions comprising adding from about 1 part per million to about 500 parts per million of an amphoteric acrylic acid copolymer to the emulsion. Once the copolymer is added, the emulsion is subjected to agitation until the oil-in-water emulsion is resolved and the oil and water separates into two phases. The oil and water phases are then subjected to a separation technique to separate the phases. The invention further comprises a method of synthesizing the amphoteric polymers used in the emulsion breaking application.

DESCRIPTION OF THE PREFERRED EMBODIMENTS

The invention comprises a method for breaking oil-in-water emulsions occurring in industry. These emulsions may occur in any number of applications, including the following:

| | |
|---|---|
| REFINERIES | Wastewater treatment systems |
| | Desalter wash water additives |
| | Ethylene Quench waters |
| | Storage tank cleanups |
| | Land storage pits |
| ALUMINUM | Coolant waters |
| | Wastewater treatment systems |
| | Hot rolling mill wastewaters |
| | Cold rolling mill wastewaters |
| | Storage tank cleanups |
| | Land storage pits |
| STEEL | Wastewater treatment systems |
| | Hot rolling mill wastewaters |
| | Cold rolling mill wastewaters |
| | Steel casing plant |
| | Acid pickling process |
| | Slag plant wash waters |
| | Storage tank cleanups |
| | Land storage pits |
| MEAT AND FOOD | Rendering plant wash waters |
| | Wastewater treatment systems |
| OILFIELD | Produced water O/W emulsion breakers |
| | Storage tank cleanups |
| | Land storage pits |
| LAUNDRIES | Wastewater treatment systems |
| AUTOMOTIVE | Wastewater treatment systems |
| | Paint spray booth detackifier |
| PULP AND PAPER | Wastewater treatment systems |
| MINING | Wastewater treatment systems |

In the preferred embodiment of the invention, the amphoteric copolymer is selected from the group consisting of dimethylaminoethyl acrylate (DMAEA), dimethylaminoethyl acrylate methyl chloride quat (DMAEA.MCQ), dimethylaminoethyl acrylate benzyl chloride quat (DMAEA.BCQ), dimethylaminoethyl methacrylate (DMAEM), dimethylaminoethyl methacrylate methyl chloride quat (DMAEM.MCQ), dimethylaminoethyl methacrylate benzyl chloride quat (DMAEM.BCQ), dimethylaminoethyl methacrylate sulfuric acid salt (DMAEM.$H_2SO_4$), N-[(3-dimethylamino)-propyl]methacrylamide (DMAPMA) and 3-[methacryloylamino-propyl]trimethyl ammonium chloride (MAPTAC).

Preferably, the copolymer is added in an amount of from about 1 part per million (ppm) to about 500 ppm. More preferably, the the copolymer is added in an amount of from about 1 ppm to about 100 ppm. Most preferably, the the copolymer is added in an amount of from about 5 ppm to about 50 ppm. The oil-in-water emulsion will preferably have an oil content of from about 0.05% by weight to about 10.0% by weight.

Agitation is introduced to the mixture after addition of the copolymer, either by mechanical stirs or by turbulence encountered through the pipe systems. The flow rates range from 10 gallons to 3000 gallons per minute, depending on the type of system that is being treated.

The listed copolymers have demonstrated theft superiority over Nalco® N-8190, polyaluminum chlorides, and other organic polymers. The size of the resultant flocced oil is much larger than with N-8190 or any organic or inorganic emulsion breakers. In most cases, the oil is liquid rather than having a cottage cheese appearance. Also, these materials provide better water clarity than with N-8190 or other organic coagulants. Finally, the flocced oil can be easily recovered and recycled without heavy metal contamination as with inorganic O/W emulsion breakers.

The copolymers of the invention have a concentration of 25% actives and are totally water soluble. The copolymers of the invention may be synthesized using free radical initiators and redox initiators, wherein the mole ratio of amine to acid ranges from 99:1 to 1:99. More preferably, the range will be from 90:10 to 50:50. The intrinsic viscosity (IV) of the copolymers ranges from 0.8 to 3.0 dL/g in 1 molar sodium nitrate.

In the synthesis of the amphoteric polymers for use in the invention as oil-in-water emulsion breakers, the water and sodium hydroxide are added to a container in a ratio of from about 99:1 to about 88:12 to, form a mixture. The mixture is then cooled to a temperature below 40° C. Next, 0.100 to 24.300 percent by weight of acrylic acid is added to the mixture, followed by the addition of 0.700 to 24.900 percent by weight of an amine acrylate to the mixture and the addition of 0.000 to 0.500 percent by weight of sodium formate dissolved in 2.0% water. The mixture is then heated to a temperature of between 50° to 70° C.

Following heating, an initiator is added. Preferably, the initiator comprises 0.0025 to 0.0500 percent by weight of 2,2'-Azobis(2-amidinopropane) dihydrochloride dissolved in 2.0% water. After addition of the initiator, the mixture is heated to a temperature of about 95° C. for from about 0.5 to about 3.0 to about hours. A second dose of initiator is then added at 0.0025 to 0.0500 percent by weight of 2,2'-Azobis(2-amidinopropane) dihydrochloride dissolved in 2.0% water, thereby reducing the residual monomer content of the mixture to preferably less than 10000 parts per million and, most preferably, less than 1000 parts per million of acrylic acid. Further, the residual monomer content is also reduced to to preferably less than 10000 parts per million and, most preferably, less than 3000 parts per million of amine acrylate.

Finally, the mixture is heated to a temperature of about 95° C. for from about 0.5 to about 3.0 hours and cooled to a temperature of from about 100° C. to about 25° C. to produce the amphoteric polymer.

The synthesis of the amphoteric polymers was made using a batch or a semibatch process. Performance testing was conducted on various O/W emulsions and results recorded. Below is a preferred batch process procedure.

Batch Procedure

| Materials Needed | Weight Percent |
|---|---|
| Water | 67.0640 |
| Sodium Hydroxide | 2.4260 |
| Acrylic Acid | 3.4400 |
| DMAEA.MCQ | 26.9500 |
| Sodium Formate | 0.1000 |
| 2,2'-Azobis(2-amidinopropane) dihydrochloride | 0.0200 |
| TOTAL | 100.0000 |

To a 500 mL four-necked round bottom flask equipped with an overhead stirrer, nitrogen purge line, temperature probe and water-cooled condenser was added 64.064 g of water and 2.426 g of sodium hydroxide using moderate agitation (500 rpm). The solution was cooled and 3.4400 g of acrylic acid was added keeping the temperature below 40° C. The pH of the solution was between 4.5 and 5 as measured using an Orion Research Digital pH/Millivolt Meter 611. 26.9500 g of dimethylaminoethyl acrylate methylchloride quat (DMAEA.MCQ) was added to the solution. A solution of sodium formate (0.1000 g) and water (1.0000 g) was added. The solution was heated to 64° C. when the nitrogen purge was started, and the first addition of a solution of 2,2'-Azobis(2-amidinopropane) dihydrochloride (0.0100 g) in water (1.0000 g) was added. An exotherm of 30°–35° C. was observed. The reaction was held at 95° C. for 2 hours, when the second addition of a solution of 2,2'-Azobis(2-amidinopropane) dihydrochloride (0.0100 g) in water (1.0000 g) was added to reduce the residual monomers to below 1000 ppm acrylic acid and 3000 ppm of DMAEA.MCQ. The reaction continued at 95° C. for an additional 2 hours. The product was cooled and poured into an 8 ounce bottle.

Product Specifications

| | |
|---|---|
| Appearance: | Light, Clear Liquid |
| Flash Point: | No Flash, samples boils out of cup at 215° F. |
| Brookfield Viscosity: | <7,000 cps |
| Pour Point: | 30° F. |
| Specific Gravity: | 1.0959 |
| pH: | 4.35 |
| Solubility in Water: | Soluble |
| IV: | 0.8–1.8 dL/g |

The amine acrylates that reacted the best with acrylic acid were DMAEA. MCQ, DMAEA.BCQ and DMAEM. The MAPTAC and DMAPMA monomers did not react very well with acrylic acid despite repeated attempts using different initiators and reaction temperatures. The polymer actives were held at 25%. The IVs ranged from 0.8 to 2.6. The initial copolymers had mole ratios of amine acrylate to acrylic acid between 70:30 and 85:15 (Table 1, entries 1–13).

The amine acrylate/acrylic acid copolymers were tested on a variety of O/W emulsions from refineries. In all cases, the DMAEA.MCQ/AA copolymer had better performance than either the DMAEA.BCQ/AA or DMAEM/AA.

EXAMPLES

The following examples are presented to describe preferred embodiments and utilities of the invention and are not meant to limit the invention unless otherwise stated in the claims appended hereto.

Two tests for determining the efficacy of a given polymer as an oil-in-water emulsion breaker were used in evaluating the claimed compound. Descriptions of these two tests are given below.

Bottle Test Procedure for Oil-in-Water Emulsion Breaking

I. Obtain at least a three gallon sample. This sample should not have been previously treated for O/W emulsion resolution.

II. Into seven 6-ounce prescription bottles (160 mL) pour 100 mL of sample.

III. Cap the bottles and invert to coat the inside with the emulsion.

IV. Using a paint pen, number the bottles from 1–7.

V. To the bottles, add the comparison chemical in 10 part per million (ppm) increments starting with 25 ppm. Bottle #7 is a blank.

VI. Close the bottles tightly, and shake the bottles vigorously 100 times.

VII. After shaking, look for a change in color of the oil. The oil may be flocced or in a liquid phase.
Grade the water clarity by a scale from 1 to 10 with 1 being best and 10 being poorest. Note any observations.

VIII. Loosen the caps and put the bottles into a waterbath, if necessary. The temperatue of this bath depends on the conditions of the system.

IX. Let the bottles set for 5 minutes to reach the desired temperature. Note and measure any solids drop, oil layer, color change, water clarity, rag layer, etc.

X. Tighten the caps and shake vigorously 100 times. Again, look for a change in viscosity or a color change. Record the solids drop, water drop, oil layer, color change, water clarity, rag layer, etc.

XI. Repeat the above process using different chemicals at the best dosages found above.

XII. After identifying the best chemical, run the test at several different dosages to determine the minimum and maximum dosages.

JAR TESTING PROCEDURE

SUMMARY OF METHOD

The treating abilities of chemicals are evaluated visually while 500 mL samples of water are mixed by a gang stirrer.

PROCEDURE

I. Collect a 2–5 gallon sample of an oil-in-water emulsion water.
II. Fill four 1000 mL beakers to the 500 mL mark.
III. Place the beakers under paddles and lower the paddles into the fluid.
IV. Pipet dosages of chemicals using 1% solutions.
V. Start stirrers and agitate at maximum speed for approximately 15 seconds. After this period, reduce agitation.
VI. Observe coagulation and flocculation characteristics for each beaker. Note the speed of floc formation, the size of the floc and the relative water clarity.
VII. Rate the beakers with numerical grades of 1–10 with 10 being best. Observe the tendency of the floc to rise or fall. More accurate ppm readings can be obtained by running solvent extractions on the water and comparing to a standardized curve. See EPA Method 413.2 for a freon extraction procedure.

EXAMPLE 1

Reactions between amine acrylates and acrylic acid (AA) were conducted at various mole ratios (Table 1). Factors include ratios of amines to acids and the mount of initiator used. The response factors were intrinsic viscosity (IV), neat viscosity and performance data such as water clarity in Ntu, floc size and floc strength.

The amine acrylates used were dimethylaminoethyl acrylate methyl chloride quat (DMAEA.MCQ), dimethylaminoethylmethacrylate (DMAEM), dimethylaminoethyl acrylate benzyl chloride quat (DMAEA.BCQ), dimethylaminoethylmethacrylate methyl chloride quat (DMAEM.MCQ), [3-methacryloylamino-propyl]trimethyl ammonium chloride (MAPTAC), and N-[3-(Dimethylamino)propyl]-methacrylamide (DMAPMA). Acrylic acid was used for the acid functionality.

Bottle and jar testing were conducted at two sites. The results are in Tables 2 and 3. The products were evaluated on their efficiency to resolve emulsified oil from the wastewater.

Site A was a refinery that had two locations that can use chemical: (1) the dissolved air flotation unit (DAF); and (2) the API Separator unit. The DAF was using Nalco® N-7192, a cationic flocculant and the API Separator was not using chemical treatment. Initial testing was conducted on the API Separator unit. As can be seen from Table 2, the Blank sample had 86.7 Ntu whereas the amphoterics consistently produced very clear water with less than 20 Ntus. The DMAEA.MCQ/AA copolymers produced large floc that easily settled to the bottom of the jar during the test.

A sample from the desalter wash water which was sent without treatment to the water waste treatment plant (WWTP) was then tested. The oil content of the sample was 7%. The oil was emulsified and the water was a brown, muddy color. Treatment of this sample with the amphoteric materials as shown in Table 3, showed that the new amphoteric compounds can easily break the oil-in-water emulsions and render clean water and an oil/water liquid interface with little solids and rag layer. An aliquot of water was taken from the bottles and the Ntu measured. The Ntu were measured using a Hach Portable 2100P Turbidimeter with a sample size of 15 mL.

Based on the initial work, it seemed that the DMAE-A.MCQ/Acrylic acid and DMAEA.BCQ/Acrylic Acid copolymers needed to be fine tuned as to the molecular weight (i.e., IV) and mole ratios of acrylic acid to amine acrylate.

A series of copolymers using acrylic acid and DMAE-A.MCQ was synthesized. The monomer mole ratios ranged from 50:50 to 90:10 amine acrylates to acrylic acid. It was noticed that greater amounts of AA increased the neat viscosity and the IV of the resulting polymer. However, it should be noted that gelling did not occur. Also, an identical series of copolymers using DMAEA.BCQ/AA, with the monomer mole ratios ranging from 90:10 to 40:60, was made for comparing the differences in the performance of the MCQ vs. BCQ polymers.

Since the process was of a two factor design—percent initiator and ratio of amine to acid—a modified experimental design was used to determine the best way of synthesizing the appropriate molecule. Based on the initial data, the molecule with the highest IV resolved the emulsion at the lowest dosage. Therefore, the design was to develop a molecule to give a high IV, a reasonable neat viscosity, and resolve the O/W emulsions.

Four reactions were used in the experimental design model with the mine/acid mole ratio either 70/30 or 80/20 and the initiator levels at 0.0025, 0.0075 and 0.0125 weight percent. The highest IV was obtained with the 70:30 ratio and 0.0025 initiator concentration. However, the bulk viscosity was 10,000 cps. When using 0.0125% initiator in the reaction, and IV of 1.75 was obtained, with a bulk viscosity of 5,500 cps.

The 70:30 mole ratio polymer was tested at four locations with other ratios and the DMAEA.BCQ/Acrylic acid copolymers. These results are summarized below and in Tables 4–10.

Site A—Tables 4–6—DAF and API Separator Influents

Two locations were tested. The DAF influent and following the DAF, the API Separator influent, were tested. Jar testing showed that Nalco® N-8156 (polyaluminum chloride) without Nalco® N-7766 (an anionic flocculant) gave an Ntu reading of 86.5; with Nalco® N-7766 added, a Ntu reading of 21.9 was measured (entry 2). Using DMAE-A.MCQ/Acrylic acid copolymer at a mole ratio of 70:30, the resultant water had a Ntu reading of 14.4 without Nalco® N-7766 (entry 23). In fact, no improvement was achieved with the anionic flocculant. Moreover, several ratios of amphoterics were better than Nalco® N-8156 including the ratios of 80:20 and 90:10.

Table 5 shows the best of the amphoterics from Table 4 with the ratio test using the Jar test procedure. As can be seen, the 70:30 (entries 51–53) and 80:20 (entries 54–56) ratios provided the best water clarity and strongest floc for the DAF Influent wastewater at Site A. With the conventional chemistries as tested in Table 4, a dual program is needed to obtain clear water, as opposed to a one chemical approach using the amphoterics.

Jar tests were conducted on the API Separator Influent and the results are in Table 6. This test used a visual reading instead of a turbidimeter. The scale is from 1 to 10 with 1 being the best and 10 being the worst. In this case, the jars were recorded from 1 to 4 with 1 being the best and clearest water. The final two entries sum up the data. The 80:20 and the 70:30 ratios of the DMAEA.MCQ/Acrylic acid copolymers with the 70:30 mole ratio being slightly better.

Site B—Desalter Wash Water—Table 7 and 8

The amphoterics were evaluated on the Desalter wash water effluent from the process side of the refinery (Table 7). Bottle testing on the Desalter effluent showed that the 70:30 and 80:20 mole ratios of DMAEA.MCQ/Acrylic acid outperformed all other amphoterics and N-7156 (polyaluminum chloride) and N-8190 (polyDADMAC/Acrylic acid copolymer). There was no visible floc on the surface on the water. The recovered oil was liquid at 75° C. and did not have a cottage cheese appearance, a characteristic typical of flocced oils.

A dosage test was conducted on the Site B sample and the results are shown in Table 8. In this test the DMAEA.MCQ/AA are tested against the DMAEA.BCQ/AA copolymers. As can be seen from the data, the MCQ copolymers clearly are better than the BCQ materials and the 70:30 is slightly better than the 80:20 mole ratios at lower dosages.

Site C—Table 9

The amphoterics were jar tested on the API influent of the wastewater treatment plant (Table 9). The 70:30 and the 80:20 mole ratios of DMAEA.MCQ/AA were nearly identical in removing the oil from the water. These two mole ratios were tested against the DMAEA.BCQ/AA copolymers in a head-to-head match up. The DMAEA.MCQ/AA was the best copolymer.

D. Site D—Desalter Wash Water—Table 10

The amphoterics were tested on the Desalter effluent. The goal at Site D was to remove as much of the oil from the desalter brine water as possible. There was 10% emulsified oil in the water. Bottle testing at 160° F. with additional agitation via shaking, would remove the oil from the water. The best experimental copolymer was the 70:30 mole ratio of DMAEA.MCQ/Acrylic Acid. This material provided clear, slightly yellow water and oil that quickly floated to the surface. Conventional polymers did not resolve the oil-in-water emulsion. The water contained less than 100 ppm of oil. In all of the above cases, the MCQ copolymers clearly were superior to the BCQ copolymers.

TABLE 1

Summary of Amphoteric Reactions

| NB # | AMINE | ACID | Am/Ac | Cat | % Sol | IV |
|---|---|---|---|---|---|---|
| 001SQ | DMAEA.BCQ | Acrylic | 90:10 | V-64 | 36.3 | 1.11 |
| 002SQ | DMAEA.BCQ | Acrylic | 67:33 | V-64 | 34.2 | 1.57 |
| 003SQ | MAPTAC | Acrylic | 67:33 | V-64 | 15.2 | 0.75 |
| 004SQ | DMAEA.MCQ | Acrylic | 72:28 | V-64 | 24.5 | 1.09 |
| 005SQ | DMAEA.MCQ | Acrylic | 72:28 | V-64 | 24.5 | 1.21 |
| 006SQ | DMAEM | Acrylic | 80:20 | V-64 | 22.3 | 1.49 |
| 013SQ | DMAEM | Acrylic | 67:33 | V-64 | 24.6 | 1.77 |
| 014SQ | DMAEM | Acrylic | 80:20 | V-64 | 22.3 | 1.54 |
| 015SQ | DMAEM | Acrylic | 57:43 | V-64 | 26.9 | 3.00 |
| 016SQ | DMAEA.BCQ | Acrylic | 57:43 | V-64 | 41.1 | 1.73 |
| 017SQ | DMAEA.MCQ | Acrylic | 93:7 | V-64 | 25 | 1.39 |
| 018SQ | DMAEA.MCQ | Acrylic | 85:15 | V-64 | 25 | 1.52 |
| 019SQ | DMAEA.BCQ | Acrylic | 70:30 | V-64 | 25 | 1.73 |
| 020SQ | DMAEA.BCQ | Acrylic | 60:40 | V-64 | 25 | 0.92 |
| 023SQ | DMAEA.BCQ | Acrylic | 50:50 | V-64 | 25 | 1.00 |
| 024SQ | DMAEA.BCQ | Acrylic | 90:10 | V-64 | 25 | 0.18 |
| 025SQ | DMAEA.BCQ | Acrylic | 81:19 | V-64 | 25 | 2.01 |
| 026SQ | DMAEA.MCQ | Acrylic | 90:10 | V-64 | 25 | 1.21 |
| 027SQ | DMAEA.MCQ | Acrylic | 80:20 | V-64 | 25 | 2.23 |
| 028SQ | DMAEA.MCQ | Acrylic | 70:30 | V-64 | 25 | 1.88 |
| 029SQ | DMAEA.BCQ | Acrylic | 90:10 | V-64 | 25 | 0.57 |
| 030SQ | DMAEA.MCQ | Acrylic | 60:40 | V-64 | 25 | 2.12 |
| 031SQ | DMAEA.MCQ | Acrylic | 50:50 | V-64 | 25 | 2.32 |
| 044SQ | DMAEA.BCQ | Acrylic | 80:20 | V-64 | 25 | 2.01 |
| 045SQ | DMAEA.MCQ | Acrylic | 90:10 | V-64 | 25 | 1.33 |
| 046SQ | DMAEA.MCQ | Acrylic | 80:20 | V-64 | 25 | 1.53 |
| 047SQ | DMAEA.MCQ | Acrylic | 70:30 | V-64 | 25 | 1.67 |
| 048SQ | DMAEA.MCQ | Acrylic | 60:40 | V-64 | 25 | 2.15 |
| 056SQ | DMAEA.H2SO4 | Acrylic | 70:30 | V-64 | 25 | 1.88 |
| 062SQ | DMAEA.MCQ | Acrylic | 80:20 | V-64 | 25 | 1.63 |
| 063SQ | DMAEA.MCQ | Acrylic | 80:20 | V-67 | 25 | 1.89 |
| 065SQ | DMAEA.MCQ | Acrylic | 80:20 | V-64 | 25 | 1.75 |
| 071SQ | DMAEA.BCQ | Acrylic | 70:30 | V-64 | 25 | 1.57 |
| 072SQ | DMAEA.BCQ | Acrylic | 70:30 | V-64 | 25 | 1.41 |
| 073SQ | DMAEA.BCQ | Acrylic | 70:30 | V-64 | 25 | 1.20 |
| 074SQ | DMAEA.BCQ | Acrylic | 80:20 | V-64 | 25 | 1.31 |
| 075SQ | DMAEA.BCQ | Acrylic | 70:30 | V-64 | 25 | 1.46 |
| 078SQ | DMAEA.MCQ | Acrylic | 70:30 | V-67 | 25 | 1.83 |

TABLE 2

Initial Evaluation - Site A

| # | Amine | Acid | Ratio | IV | Dosage | Ntu | Floc |
|---|---|---|---|---|---|---|---|
| 001SQ | DMAEA.BCQ | Acrylic | 90/10 | 1.11 | 10 ppm | 19.6 | Pin Floc, Settles |
| 002SQ | DMAEA.BCQ | Acrylic | 67/33 | 1.57 | 10 ppm | 19.0 | Pin Floc, Settles |
| 019SQ | DMAEA.BCQ | Acrylic | 70/30 | 1.73 | 10 ppm | 19.5 | Pin Floc, Settles |
| 004SQ | DMAEA.MCQ | Acrylic | 72/28 | 1.09 | 10 ppm | 14.7 | Large Floc, Settles |
| 028SQ | DMAEA.MCQ | Acrylic | 70/30 | 1.88 | 10 ppm | 16.5 | Large Floc, Settles |
| 027SQ | DMAEA.MCQ | Acrylic | 80/20 | 2.23 | 10 ppm | 14.4 | Large Floc, Settles |
| 005SQ | DMAEM.MCQ | Acrylic | 72/28 | 1.21 | 10 ppm | 25.9 | Pin Floc, Settles |
| 006SQ | DMAEM.MCQ | Acrylic | 70/30 | 1.49 | 10 ppm | 21.1 | Pin Floc, Settles |
| 007SQ | DMAEM.MCQ | Acrylic | 80/20 | 1.02 | 10 ppm | 27.2 | Pin Floc, Settles |
| 056SQ | DMAEM.H2SO4 | Acrylic | 70/30 | 1.88 | 10 ppm | 27.3 | Pin Floc, Settles |
| 014SQ | DMAEM | Acrylic | 80/20 | 1.54 | 10 ppm | 65.9 | Pin Floc, Floats |
| 013SQ | DMAEM | Acrylic | 67/33 | 1.77 | 10 ppm | 76.1 | Pin Floc, Floats |
| | Blank | | | | | 87.7 | No Treatment |

TABLE 3

Initial Evaluation - Site B

| # | Amine | Acid | Ratio | IV | Dosage | Ntu | Floc |
|---|---|---|---|---|---|---|---|
| 001SQ | DMAEA.BCQ | Acrylic | 90/10 | 1.11 | 50 ppm | 9.9 | Liquid Interface |
| 002SQ | DMAEA.BCQ | Acrylic | 67/33 | 1.57 | 50 ppm | 46.8 | Liquid Interface |
| 019SQ | DMAEA.BCQ | Acrylic | 70/30 | 1.73 | 50 ppm | 12.6 | Floc Floats |
| 004SQ | DMAEA.MCQ | Acrylic | 72/28 | 1.09 | 50 ppm | 12.0 | Liquid Interface |
| 028SQ | DMAEA.MCQ | Acrylic | 70/30 | 1.88 | 50 ppm | 10.9 | Liquid Interface |
| 027SQ | DMAEA.MCQ | Acrylic | 80/20 | 2.23 | 50 ppm | 11.5 | Liquid Interface |
| 005SQ | DMAEM.MCQ | Acrylic | 72/28 | 1.21 | 50 ppm | 23.6 | Floc Floats |
| 006SQ | DMAEM.MCQ | Acrylic | 70/30 | 1.49 | 50 ppm | 22.7 | Floc Floats |
| 007SQ | DMAEM.MCQ | Acrylic | 80/20 | 1.02 | 50 ppm | 26.1 | Floc Floats |
| 056SQ | DMAEM.H2SO4 | Acrylic | 70/30 | 1.88 | 50 ppm | 82.4 | Floc Floats |
| 014SQ | DMAEM | Acrylic | 80/20 | 1.54 | 50 ppm | 63.7 | Floc Floats |
| 013SQ | DMAEM | Acrylic | 67/33 | 1.77 | 50 ppm | 77.9 | Floc Floats |
| | Blank | | | | | 287 | No Treatment |

TABLE 4

Jar Test of Amphoterics of DAF Influent from Site A

| # | Chemical | Dosage (ppm) | NTU BF | NTU AF | Comments |
|---|---|---|---|---|---|
| 1 | 8156 | 5 | 97.6 | 48.3 | Pin floc before 7763 addition - Settles slowly |
| 2 | 8156 | 10 | 86.5 | 21.9 | Pin floc before 7763 addition - Settles faster |
| 3 | 8190 | 5 | 94.1 | 68.2 | Emulsion not broken - small |
| 4 | 8190 | 10 | 88.4 | 49.6 | Emulsion not broken - small |
| 5 | 001SQ | 10 | 19.6 | 18.9 | Larger floc than #2 BF - Settles fast - Big floc |
| 6 | 002SQ | 10 | 19 | 19.5 | Larger floc than #2 BF - Settles fast - Big floc |
| 7 | 003SQ | 10 | 28 | 24.9 | Pin floc like #1 - Settles slowly BF & AF |
| 8 | 004SQ | 10 | 14.7 | 13.7 | Large floc BF - Settles fast - Big floc AF |
| 9 | 005SQ | 10 | 21.1 | 29 | Larger floc than #2 BF - Settles fast - Big floc |
| 10 | 006SQ | 10 | 82.2 | 89.3 | Pin floc like #1 - Settles slowly BF & AF |
| 11 | 013SQ | 10 | 76.1 | 98.6 | Pin floc like #1 - Settles slowly BF & AF |
| 12 | 014SQ | 10 | 65.9 | 120 | Pin floc like #1 - Settles slowly BF & AF |
| 13 | 015SQ | 10 | 51.2 | 156 | Pin floc like #1 - Settles slowly BF & AF |
| 14 | 016SQ | 10 | 24.6 | 24.3 | Best floc BF - Settles Fast AF - Big floc |
| 15 | 017SQ | 10 | 21.5 | 17.6 | Larger floc than #2 BF - Settles fast - Big floc |
| 16 | 018SQ | 10 | 16.1 | 15.5 | Larger floc than #2 BF - Settles fast - Big floc |
| 17 | 019SQ | 10 | 19.5 | 17.2 | Larger floc than #2 BF - Settles fast - Big floc |
| 18 | 020SQ | 10 | 15.5 | 19.1 | Larger floc than #2 BF - Settles fast - Loose floc |
| 19 | 021SQ | 10 | 19.3 | 22.1 | Larger floc than #2 BF - Settles fast - Medium |
| 20 | 024SQ | 10 | 21.7 | 20.6 | Larger floc than #2 BF - Settles fast - Big floc |
| 21 | 026SQ | 10 | 11.9 | 12.5 | Larger floc than #2 BF - Settles fast - Big floc |
| 22 | 027SQ | 10 | 14.4 | 15.6 | Larger floc than #2 BF - Settles fast - Big floc |
| 23 | 028SQ | 10 | 16.5 | 14.4 | Larger floc than #2 BF - Settles fast - Big floc |

TABLE 4-continued

Jar Test of Amphoterics of DAF Influent from Site A

| # | Chemical | Dosage (ppm) | NTU BF | NTU AF | Comments |
|---|---|---|---|---|---|
| 24 | 030SQ | 10 | 14.7 | 14.2 | Larger floc than #2 BF - Settles fast - Big floc |
| 25 | 031SQ | 10 | 20.1 | 20.8 | Larger floc than #2 BF - Settles fast - Big floc |
| 26 | 044SQ | 10 | 18.4 | 21.1 | Larger floc than #2 BF - Settles fast - Big floc |
| 27 | 8156 | 10 | 98.5 | 24.4 | Pin floc before 7763 addition - Settles faster |
| 28 | 045SQ | 10 | 18.7 | 16.1 | Larger floc than #2 BF - Settles fast - Big floc |
| 29 | 046SQ | 10 | 14.8 | 14.5 | Larger floc than #2 BF - Settles fast - Big floc |
| 30 | 047SQ | 10 | 16.4 | 17.5 | Larger floc than #2 BF - Settles fast - Big floc |
| 31 | 048SQ | 10 | 20.6 | 18.1 | Larger floc than #2 BF - Settles fast - Big floc |
| 32 | 056SQ | 10 | 27.3 | 29.6 | Larger floc than #2 BF - Settles fast - Big floc |

TABLE 5

Jar Test of Amphoterics of DAF Influent from Site A

| # | Chemical | Dosage (ppm) | NTU BF | NTU AF | Comments |
|---|---|---|---|---|---|
| 33 | 004SQ | 5 | 13.1 | 13.9 | Larger floc than #2 BF - Settles fast - Big floc |
| 34 | 004SQ | 10 | 14.2 | 12.6 | Larger floc than #2 BF - Settles fast - Big floc |
| 35 | 004SQ | 15 | 15.2 | 13.8 | Larger floc than #2 BF - Smaller floc (OT?) AF |
| 36 | 018SQ | 5 | 16.5 | 16.1 | Larger floc than #2 BF - Settles fast - Big floc |
| 37 | 018SQ | 10 | 16.1 | 13.3 | Larger floc than #2 BF - Settles fast - Big floc |
| 38 | 018SQ | 15 | 17.4 | 14.1 | Larger floc than #2 BF - Smaller floc (OT?) AF |
| 39 | 026SQ | 5 | 13.6 | 18.2 | Larger floc than #2 BF - Settles fast - Big floc |
| 40 | 026SQ | 10 | 12.3 | 15.5 | Larger floc than #2 BF - Settles fast - Big floc |
| 41 | 026SQ | 15 | 10.9 | 10.3 | Larger floc than #2 BF - Settles fast - Big floc |
| 42 | 030SQ | 5 | 15.2 | 14.2 | Larger floc than #2 BF - Settles fast - Big floc |
| 43 | 030SQ | 10 | 16.2 | 14.9 | Larger floc than #2 BF - Settles fast - Big floc |
| 44 | 030SQ | 15 | 19.9 | 16.2 | Larger floc than #2 BF - Settles fast - Big floc |
| 45 | 027SQ | 5 | 12.8 | 14.1 | Larger floc than #2 BF - Settles fast - Big floc |
| 46 | 027SQ | 10 | 12.6 | 12.6 | Larger floc than #2 BF - Settles fast - Big floc |
| 47 | 027SQ | 15 | 18.9 | 13.5 | Larger floc than #2 BF - Settles fast - Big floc |
| 48 | 045SQ | 5 | 13.6 | 14.3 | Larger floc than #2 BF - Settles fast - Big floc |
| 49 | 045SQ | 10 | 14.6 | 15.5 | Larger floc than #2 BF - Settles fast - Big floc |
| 50 | 045SQ | 15 | 12.9 | 14.1 | Larger floc than #2 BF - Settles fast - Big floc |
| 51 | 028SQ | 5 | 11.6 | 11.2 | Larger floc than #2 BF - Settles fast - Big floc |
| 52 | 028SQ | 10 | 11.2 | 10.6 | Larger floc than #2 BF - Settles fast - Big floc |
| 53 | 028SQ | 15 | 14.9 | 11.6 | Larger floc than #2 BF - Smaller floc (OT?) AF |
| 54 | 046SQ | 5 | 11.4 | 12.6 | Larger floc than #2 BF - Settles fast - Big floc |
| 55 | 046SQ | 10 | 9.85 | 9.95 | Larger floc than #2 BF - Settles fast - Big floc |
| 56 | 046SQ | 15 | 10.5 | 9.15 | Larger floc than #2 BF - Smaller floc (OT?) AF |

TABLE 6

Jar Tests of Amphoteric Polymers @ Site A - API Separator Influent

| CHEMICAL | CHEMISTRY | RATIO | IV | DOSAGE | WATER | FLOC |
|---|---|---|---|---|---|---|
| 045SQ | MCQ/AA | 90/10 | 1.33 | 20 ppm | 2 | 2 |
| 063SQ | MCQ/AA | 80/20 | 1.89 | 20 ppm | 4 | 3 |
| 075SQ | BCQ/A | 70/30 | 1.46 | 20 ppm | 3 | 4 |
| 078SQ | MCQ/AA | 70/30 | 1.83 | 20 ppm | 1 | 1 |
| 082SQ | MCQ/AA | 70/30 | 1.55 | 20 ppm | 1 | 1 |
| 084SQ | MCQ/AA | 80/20 | 0.92 | 20 ppm | 4 | 4 |
| 087SQ | MCQ/AA | 50/50 | 1.39 | 20 ppm | 3 | 3 |
| 091SQ | MCQ/AA | 50/50 | 1.49 | 20 ppm | 2 | 2 |
| 018SQ | MCQ/AA | 85/15 | 1.21 | 20 ppm | 3 | 4 |
| 027SQ | MCQ/AA | 80/20 | 1.67 | 20 ppm | 3 | 3 |
| 062SQ | MCQ/AA | 80/20 | 1.63 | 20 ppm | 1 | 1 |
| 063SQ | MCQ/AA | 80/20 | 1.89 | 20 ppm | 2 | 2 |
| 028SQ | MCQ/AA | 70/30 | 1.88 | 20 ppm | 2 | 2 |
| 047SQ | MCQ/AA | 70/30 | 1.67 | 20 ppm | 3 | 3 |
| 078SQ | MCQ/AA | 70/30 | 1.83 | 20 ppm | 4 | 4 |

TABLE 6-continued

Jar Tests of Amphoteric Polymers @ Site A - API Separator Influent

| CHEMICAL | CHEMISTRY | RATIO | IV | DOSAGE | WATER | FLOC |
|---|---|---|---|---|---|---|
| 081SQ | MCQ/AA | 70/30 | 1.54 | 20 ppm | 1 | 1 |
| 062SQ | MCQ/AA | 80/20 | 1.63 | 20 ppm | 2 | 2 |
| 081SQ | MCQ/AA | 70/30 | 1.54 | 20 ppm | 1 | 1 |

TABLE 7

Bottle Results of Site B Refinery - Desalter Underflow

| # | Chemical | Amine/Acid | Dosage | Water Ntu | Floc | IV | Comments |
|---|---|---|---|---|---|---|---|
|   | Blank | N/A | 0 ppm | 362 | NT |  | No Treatment |
| B | 016SQ | 57:43 | 50 ppm | 18.3 | None | 1.73 |  |
| B | 019SQ | 70:30 | 50 ppm | 19.4 | None | 1.73 |  |
| B | 020SQ | 60:40 | 50 ppm | 57.3 | Present | 0.92 |  |
| B | 023SQ | 50:50 | 50 ppm | 29.4 | Present | 1.00 |  |
| B | 024SQ | 90:10 | 50 ppm | 145 | Present | 0.18 |  |
| B | 044SQ | 80:20 | 50 ppm | 119 | Present | 0.57 |  |
| B | 002SQ | 72:28 | 50 ppm | 21.8 | Present | 1.07 | Most Floc |
| M | 026SQ | 90:10 | 50 ppm | 42.5 | None | 1.21 |  |
| M | 027SQ | 80:20 | 50 ppm | 13.5 | None | 2.23 |  |
| M | 028SQ | 70:30 | 50 ppm | 11.9 | None | 1.88 |  |
| M | 030SQ | 60:40 | 50 ppm | 12.2 | None | 2.12 | Clean water |
| M | 031SQ | 50:50 | 50 ppm | 59.1 | None | 2.32 |  |
| M | 046SQ | 80:20 | 50 ppm | 20.6 | None | 1.73 |  |
| M | 062SQ | 80:20 | 50 ppm | 8.17 | Present | 2.19 | Cleanest Water |
| M | 063SQ | 80:20 | 50 ppm | 89.1 | None | 0.29 |  |

Temperature = 75C.
pH = 7.2

TABLE 8

Amphoterics Evaluation @ Site B - Desalter Wash Water Effluent

| Chemical | Chemistry | Ratio | IV | Dosage | Ntu | Floc |
|---|---|---|---|---|---|---|
| 062SQ | DMAEA.MCQ/AA | 80/20 | 1.63 | 40 ppm | 22.5 | Liquid |
| 062SQ | DMAEA.MCQ/AA | 80/20 | 1.63 | 50 ppm | 20.2 | Liquid |
| 062SQ | DMAEA.MCQ/AA | 80/20 | 1.63 | 60 ppm | 17.9 | Liquid |
| 118SQ | DMAEA.MCQ/AA | 70/30 | 1.38 | 40 ppm | 15.5 | Liquid |
| 118SQ | DMAEA.MCQ/AA | 70/30 | 1.38 | 50 ppm | 13.1 | Liquid |
| 118SQ | DMAEA.MCQ/AA | 70/30 | 1.38 | 60 ppm | 11.6 | Liquid |
| 044SQ | DMAEA.BCQ/AA | 80/20 | 2.02 | 40 ppm | 83.7 | Poor |
| 044SQ | DMAEA.BCQ/AA | 80/20 | 2.02 | 50 ppm | 79.6 | Poor |
| 044SQ | DMAEA.BCQ/AA | 80/20 | 2.02 | 60 ppm | 80.3 | Poor |
| 019SQ | DMAEA.BCQ/AA | 70/30 | 1.73 | 40 ppm | 77.6 | Poor |
| 019SQ | DMAEA.BCQ/AA | 70/30 | 1.73 | 50 ppm | 75.9 | Poor |
| 019SQ | DMAEA.BCQ/AA | 70/30 | 1.73 | 60 ppm | 73.3 | Poor |

TABLE 9

Amphoterics Evaluation @ Site C - API Influent

| Chemical | Chemistry | Ratio | IV | Dosage | Ntu | Floc |
|---|---|---|---|---|---|---|
| 046SQ | DMAEA.MCQ/AAA | 80/20 | 1.53 | 5 ppm | 16.2 | Medium - |
| 027SQ | DMAEA.MCQ/AA | 80/20 | 2.23 | 5 ppm | 21.2 | Weak - Floats |
| 047SQ | DMAEA.MCQ/AA | 70/30 | 1.67 | 5 ppm | 16 | Medium - |
| 048SQ | DMAEA.MCQ/AAA | 60/40 | 2.15 | 5 ppm | 14.7 | Medium - |

TABLE 9-continued

Amphoterics Evaluation @ Site C - API Influent

| Chemical | Chemistry | Ratio | IV | Dosage | Ntu | Floc |
|---|---|---|---|---|---|---|
| 020SQ | DMAEA.BCQ/AA | 60/40 | 0.92 | 5 ppm | 29.9 | Poor |
| 030SQ | DMAEA.MCQ/AA | 60/40 | 2.12 | 5 ppm | 16.4 | Medium - |
| 023SQ | DMAEA.BCQ/AA | 50/50 | 1.00 | 5 ppm | 24.8 | Weak - Floats |
| 056SQ | DMAEM.H$_2$SO4/AA | 70/30 | 1.88 | 5 ppm | 21.5 | Weak - Floats |
| 001SQ | DMAEA.BCQ/AA | 90/10 | 1.11 | 5 ppm | 34.5 | Poor |
| 002SQ | DMAEA.BCQ/AA | 67/33 | 1.57 | 5 ppm | 27 | Weak - Floats |
| 004SQ | DMAEA.MCQ/AA | 72/28 | 1.09 | 5 ppm | 13.3 | Medium - |
| 062SQ | DMAEA.MCQ/AA | 80/20 | 1.63 | 5 ppm | 13 | Medium - |
| 118SQ | DMAEA.MCQ/AA | 70/30 | 1.38 | 5 ppm | 13.3 | Medium - |
| 044SQ | DMAEA.BCQ/AA | 80/20 | 2.02 | 5 ppm | 34.5 | Weak - Floats |
| 019SQ | DMAEA.BCQ/AA | 70/30 | 1.73 | 5 ppm | 25.2 | Weak - Floats |
| Blank | | | | | 42.5 | No Floc |
| N-8190 | AA/DADMAC | 90/10 | 1.2 min | 5 ppm | 33.2 | Poor |
| 062SQ | DMAEA.MCQ/AA | 80/20 | 1.63 | 5 ppm | 13 | Medium - |
| 062SQ | DMAEA.MCQ/AA | 80/20 | 1.63 | 10 ppm | 16.2 | Medium - |
| 062SQ | DMAEA.MCQ/AA | 80/20 | 1.63 | 15 ppm | 21.1 | Medium - |
| 118SQ | DMAEA.MCQ/AA | 70/30 | 1.38 | 5 ppm | 12.5 | Medium - |
| 118SQ | DMAEA.MCQ/AA | 70/30 | 1.38 | 10 ppm | 15.2 | Medium - |
| 118SQ | DMAEA.MCQ/AA | 70/30 | 1.38 | 15 ppm | 19.8 | Medium - |
| 044SQ | DMAEA.BCQ/AA | 80/20 | 2.02 | 5 ppm | 34.5 | Weak - Floats |
| 044SQ | DMAEA.BCQ/AA | 80/20 | 2.02 | 10 ppm | 27.1 | Weak - Floats |
| 044SQ | DMAEA.BCQ/AA | 80/20 | 2.02 | 15 ppm | 28.5 | Weak - Floats |
| 019SQ | DMAEA.BCQ/AA | 70/30 | 1.73 | 5 ppm | 25.2 | Weak - Floats |
| 019SQ | DMAEA.BCQ/AA | 70/30 | 1.73 | 10 ppm | 22.1 | Weak - Floats |
| 019SQ | DMAEA.BCQ/AA | 70/30 | 1.73 | 15 ppm | 26.9 | Weak - Floats |

TABLE 10

Amphoteric Bottle Testing at Site D - Desalter Effluent

| Chemical | Chemistry | Ratio | IV | ppm | Results @ 1 hour - 160F. |
|---|---|---|---|---|---|
| 024SQ | BCQ/AA | 90/10 | 1.21 | 30 | 5% Oil - Bad water |
| 074SQ | BCQ/AA | 80/20 | 1.31 | 30 | 10% Oil - Bad water |
| 073SQ | BCQ/AA | 70/30 | 1.20 | 30 | 10% Oil - Bad water |
| 028SQ | MCQ/AA | 70/30 | 1.88 | 30 | 5% Oil - Slightly Yellow Water, Fluffy |
| 047SQ | MCQ/AA | 70/30 | 1.67 | 30 | 5% Oil - Clear Yellow Water, Fluffy Floc |
| 082SQ | MCQ/AA | 70/30 | 1.45 | 30 | 5% Oil - Slightly Yellow Water, Fluffy |
| 117SQ | MCQ/AA | 70/30 | 1.38 | 30 | 10% Oil - Good Water, Slightly Yellow, |
| 048SQ | MCQ/AA | 60/40 | 2.15 | 30 | 10% Oil - Good Water, Slightly Yellow, |
| 112SQ | MCQAA | 50/50 | 2.57 | 30 | 10% Oil - Bad Water |
| 084SQ | MCQ/AA | 90/10 | 1.02 | 30 | 5% Oil - Bad water |
| N-8190 | AA/DADMAC | 90/10 | 1.2 min | 30 | 10% Oil - Bad Water |
| D4220M | DMAEM/H2S | | | 30 | 10% Oil - Very Bad Water, Loose Floc |
| N-7156 | PAC/Epi | | | 30 | 10% Oil - Very Bad Water, Loose Floc |
| N-8102 | pDADMAC | | 50,000 | 30 | 10% Oil - Very Bad Water, Loose Floc |
| N-8105 | DMA-Epi | | 20,000 | 30 | 10% Oil - Bad Water, Loose Floc |

Changes can be made in the composition, operation and arrangement of the method of the present invention described herein without departing from the concept and scope of the invention as defined in the following claims:

I claim:

1. A process for synthesizing amphoteric polymers for use as oil-in-water emulsion breakers, the process comprising:

adding water and sodium hydroxide to a container in a ratio of from about 99:1 to about 88:12 to form a mixture;

cooling the mixture to a temperature below 40° C.;

adding 0.100 to 24.300 percent by weight of acrylic acid to the mixture;

adding 0.700 to 24.900 percent by weight of an amine acrylate to the mixture;

adding 0.000 to 0.500 percent by weight of sodium formate dissolved in 2.0% water to the mixture, heating the mixture to a temperature of between 50° to 70° C.;

adding 0.0025 to 0.0500 percent by weight of 2,2'-Azobis(2-amidinopropane) dihydrochloride dissolved in 2.0% water to the mixture;

heating the mixture to a temperature of about 95° C. for from about 0.5 to about 3.0 to hours;

adding 0.0025 to 0.0500 percent by weight of 2,2'-Azobis(2-amidinopropane) dihydrochloride dissolved in 2.0% water to the mixture, thereby reducing the residual monomer content of the mixture to less than 10000 parts per million of acrylic acid and to less than 10000 parts per million of amine acrylate;

heating the mixture to a temperature of about 95° C. for from about 0.5 to about 3.0 hours; and cooling the solution to a temperature of from about 100° C. to about 25° C. to produce the amphoteric polymer.

2. The process of claim 1 wherein the amine acrylate is selected from the group consisting of dimethylaminoethyl acrylate methyl chloride quat, dimethylaminoethylmethacrylate, dimethylaminoethyl acrylate benzyl chloride quat, dimethylaminoethylmethacrylate methyl chloride quat, [3-methacryloylamino-propyl]trimethyl ammonium chloride, dimethylaminoethylmethacrylate sulfuric acid salt and N-[3-(Dimethylamino)propyl]methacrylamide.

* * * * *

UNITED STATES PATENT AND TRADEMARK OFFICE
CERTIFICATE OF CORRECTION

PATENT NO. : 5,552,498
DATED     : SEPTEMBER 3, 1996
INVENTOR(S) : MICHAEL L. BRADEN

It is certified that error appears in the above-indentified patent and that said Letters Patent is hereby corrected as shown below:

CLAIM 1, COLUMN 16, LINE 57 from about 0.5 to about 3.0 to hours;

LETTERS PATENT SHOULD READ AS:

from about 0.5 to about 3.0 hours;

Signed and Sealed this

Nineteenth Day of November, 1996

Attest:

BRUCE LEHMAN

*Attesting Officer*   Commissioner of Patents and Trademarks